March 24, 1942.  H. FEHR  2,277,312

FOOT TRIP

Filed May 29, 1940

INVENTOR.
Henry Fehr
BY Emil F. Lange
ATTORNEY.

Patented Mar. 24, 1942

2,277,312

UNITED STATES PATENT OFFICE 2,277,312

FOOT TRIP

Henry Fehr, Sutton, Nebr.

Application May 29, 1940, Serial No. 337,856

8 Claims. (Cl. 74—512)

My invention relates to foot trips which are designed for application to tractors for providing a convenient trip for the clutch on agricultural implements which are drawn or operated by the tractor.

The principal object of the invention is the provision of a linkage which may be secured to a tractor for the purpose of providing a foot-actuated trip for a clutch, the linkage being so designed that it may be secured to the tractor with a minimum of work and in a minimum of time.

Another object of my invention is the provision of a foot-actuated linkage, which is so formed and positioned on a tractor that it cannot interfere with the coupling or uncoupling of the implement with the tractor.

Another of my objects is the provision of a foot-operated linkage terminating in a clutch-operating lever and having a support adjacent the draw bar of the tractor, the clutch-operating lever being directly over the center of the draw bar.

Figure 1:
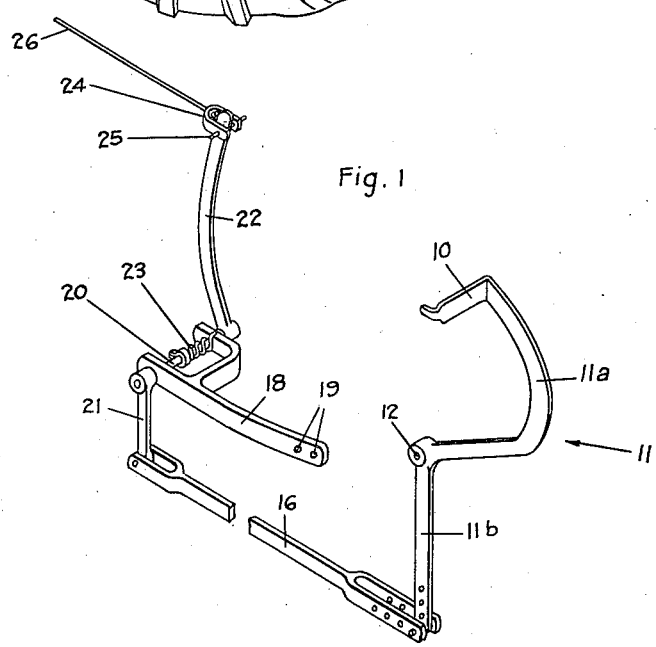

Having in view these objects and others which will be pointed out in the following description, I will now refer to the drawing, in which Figure 1 is a view in perspective of the mechanism of my foot trip as seen disassociated from the tractor.

Figure 2:
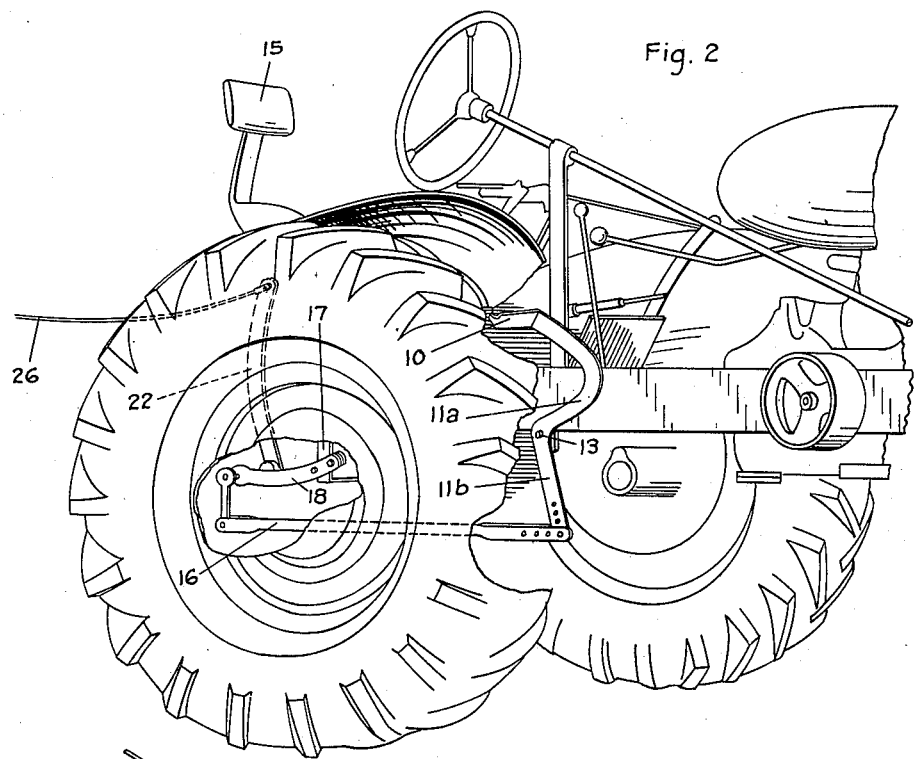

Figure 2 is a view in perspective of the same mechanism in its relation to the tractor.

Some farm implements must be thrown into or out of operation during the travel of the implement, this being especially the case with tractor-drawn plows which must be lifted out of the furrow at the end of the row and dropped to form a new furrow beginning with the next row. This is accomplished by means of a clutch on the plow and operable by the driver of the tractor. The plow construction is well known in almost infinite variation to all those skilled in the art so that its illustration is thought to be unnecessary.

In its simplest form, the operating means consists of a length of rope secured at one of its extremities to the clutch, the rope being then tied to the tractor and within convenient reach of the driver of the tractor. The rope is normally slack but tension on the rope actuates the clutch to either raise or lower the plow. Sometimes a chain or other flexible member is substituted for the rope. In some cases a hand lever is employed for manually tensioning the flexible element. The difficulty is that the hands of the operator are usually occupied just at the time when it is necessary to operate the clutch, this being especially true at the ends and beginnings of rows when the hands are fully occupied in steering the tractor and the implement. My concern is with the provision of an attachment for tractors which are not equipped for foot pedal operation of the clutch, the attachment being easily installed and so arranged and positioned as to give the operator perfect foot control of the clutch of the implement.

The pedal 10 is similar to the pedals usually occurring in agricultural implements. It is the out-turned extremity of the lever 11 which has a curved upper portion 11a and a lower straight and substantially vertical portion 11b. At the junction of the parts 11a and 11b of the lever is a pivot aperture 12 for the reception of a bolt 13 or other pivot securing the lever 11 to the tractor frame. The tractor frame in most cases is provided with a suitable aperture for the pivot 13 for pivotally securing the lever to the tractor so that the pedal 10 is in the most advantageous position relative to the driver's seat 15 where it may be actuated by the driver's foot.

The lever 11 is pivotally secured at its lower extremity to a rearwardly extending link 16 which is bifurcated at its forward extremity for the reception of the lever 11. Both the lever 11 and the link 16 are provided with a plurality of apertures for giving the device adjustability of a wide range so that the device is adapted to be applied to any of numerous tractors.

The tractor is provided with a support 17 for the draw bar and this support 17 is utilized by my device for the support of the linkage which I employ. The bracket 18 is provided with apertures 19 for receiving any suitable securing means with a support 17. The bracket 18 is forked at its rear to provide a longer bearing for the pivot 20 which connects the lever 21 with the bracket 18, the lower extremity of the lever 21 being pivotally secured to the link 16 in the bifurcated rear extremity thereof.

The pivot pin 20 passes through the bracket 18 as shown, being keyed or otherwise rigidly secured to the lever 21 and to the lever 22 at the opposite extremity of the pivot pin 20. The depression of the pedal 10 will thus cause the pivotal movement of the lever 11, the rearward movement of the link 16, and the pivotal movement of the levers 21 and 22. In order to restore the parts to idle position after the removal of the operator's foot from the pedal 10, the pivot pin 20 is surrounded by a torsion spring 23 which is adapted to turn the pivot pin 20 in the direction opposite to that resulting from the actuation of the foot lever. As shown in Figure 1 the lever 22 is bent so that it is directly above the draw bar where it does not interfere with the coupling or uncoupling of the implement with the tractor and so that the pivotal connections function perfectly at all angles.

Depression of the pedal 10 will result in the forward movement of the upper extremity of the lever 22. The clevis 24 is secured to the lever 22 at the upper extremity thereof, the securing means being a break pin 25. The rope 26 or other suitable flexible member is attached to the clevis 24 with the free end of the rope attached to the clutch on the plow or to any other suitable device which is to be actuated from the tractor.

While I have described my invention in relation to the lifting and lowering mechanism of a tractor-drawn plow, it is obvious that the foot-operated linkage is adapted to actuate the clutches of other implements which are connected to the tractor.

Having thus described my invention in such full, clear, and exact terms that its construction and operation will be readily understood by others skilled in the art to which it pertains, what I claim as new and desire to secure by Letters Patent of the United States is:

1. A foot-operated vertical lever adapted for pivotal attachment at an intermediate portion of its length to a fixed portion of the frame of a tractor and having a pedal within convenient reach of the driver of the tractor, a rearwardly projecting link, said lever being provided with a plurality of aligning apertures at the lower portion thereof and said link having a plurality of aligning apertures at the forward end portion, an upstanding lever pivotally secured to said link at the rear extremity thereof, a bracket adapted for attachment to a fixed portion of the tractor adjacent the draw bar, a pivot shaft secured to said lever at the upper extremity thereof and having its bearing in said bracket, a clutch-operating lever secured to said pivot shaft, and a torsion spring surrounding said shaft for restoring said levers to neutral position.

2. In combination, a foot-operated vertically positioned lever adapted for pivotal connection with a fixed part of a tractor frame, a bifurcated bracket adapted for rigid attachment to the draw bar guide of the tractor and at the rear of said lever, a pivot shaft journalled in the forks of said bracket, a second lever secured to and depending from said shaft, a link connecting the lower extremities of said two levers, means on both said first named lever and said link for adjustable connection, a clutch-actuating lever secured to said shaft, and a torsion spring surrounding said shaft for restoring the said levers to neutral position.

3. In combination, a linkage for attachment to a tractor, said linkage including a vertically positioned foot lever having a pivot aperture intermediate its extremities for the reception of a pivot pin projecting laterally from a fixed frame part of the tractor, a link extending rearwardly from the lower extremity of said foot lever, said lever and said link being both provided with adjustable connections, a bifurcated bracket adapted for attachment to the draw bar guide of the tractor, a pivot shaft extending through the forks of said bracket, a second lever rigidly secured to said shaft and pivotally secured to said link, a clutch-actuating lever also secured to said shaft, and a torsion spring surrounding said shaft between the forks of said bracket for automatically restoring said lever to neutral position.

4. In an attachment for association with a tractor for enabling foot operation of control apparatus in equipment drawn by said tractor, a foot operated vertically positioned lever adapted for pivotal connection with a fixed part of the tractor, a bifurcated bracket adapted for rigid attachment to a fixed part of the tractor at the rear of said lever, a pivot shaft journalled in the forks of said bracket, a second lever secured to and depending from said shaft, a link connecting the lower extremities of said two levers, means on both said first named lever and said link for adjustable connection, a further lever secured to said shaft, said last named lever being adapted to be connected to said control apparatus for operating the same, and a torsion spring surrounding said shaft for restoring the said levers to neutral position.

5. In combination, a foot operated vertically positioned lever having a pedal at the upper end thereof and being adapted at an intermediate point thereof for pivotal connection with a fixed part of a tractor, a bifurcated bracket adapted for rigid attachment to a fixed portion of the tractor and at the rear of said lever, a pivot shaft secured in the forks of said bracket, lever means pivotally associated with said pivot shaft comprising a first lever arm extending in one direction from said shaft and a clutch operating arm extending away from said first lever arm, a substantially horizontal link extending between the lower end of said foot operated lever and said the outer end of said first lever arm, means for adjustably connecting said link to said foot operated lever, and a spring acting on said lever means to restore said lever means and said foot operated lever to neutral position.

6. In an attachment for association with a tractor for enabling foot operation of control apparatus in equipment drawn by said tractor, a foot operated vertically positioned lever adapted for pivotal connection with a fixed part of the tractor, a bifurcated bracket adapted for rigid attachment to a fixed part of the tractor at the rear of said lever, a pivot shaft secured in the forks of said bracket, a second lever secured to and projecting from said shaft, a link connecting the lower extremity of said foot operated lever with the outer extremity of said second lever, means on said first named lever and said link for adjustable connection, a further lever secured to and projecting from said shaft in a direction substantially opposite to that from which said second lever projects, said further lever being adapted to be connected to said control apparatus for operating the same, and a torsion spring surrounding said shaft for restoring the said levers to neutral position.

7. In an attachment for association with a tractor for enabling foot operation of control apparatus in equipment drawn by said tractor, a foot operated vertically positioned lever adapted for pivotal connection with a fixed part of the tractor, a bifurcated bracket adapted for rigid attachment to a fixed part of the tractor at the rear of said lever, a pivot shaft secured in the forks of said bracket, a lever means pivotally associated with said pivot shaft comprising a first lever arm extending in one direction from said shaft and a further arm extending in substantially the opposite direction and adapted to be connected to said control apparatus for operating the same, a substantial horizontal link extending between said foot operated lever and the outer end of said first lever arm, and a torsion spring surrounding said shaft for restoring the same levers to neutral position.

8. In combination with a tractor, a foot operated vertically positioned lever having a foot pedal at the upper end thereof and pivotally connected to a fixed part of the tractor, a bifurcated bracket rigidly attached to a fixed part of the tractor at the rear of said tractor and at the rear of said lever, a pivot shaft secured in the forks of said bracket, lever means pivotally associated with said pivot shaft comprising a first lever arm extending in one direction from said shaft and a further arm extending away from said first lever arm and provided with means for connecting the same to control apparatus of equipment drawn by said tractor, a substantially horizontal link extending between said foot operated lever and the outer end of said first lever arm, and a spring acting on said lever means to restore said lever means and said foot operated lever to neutral position.

HENRY FEHR.